United States Patent [19]

Kolbus et al.

[11] Patent Number: 5,599,033
[45] Date of Patent: Feb. 4, 1997

[54] CONVERTIBLE TRAILER AND JOGGING STROLLER FOR TWO CHILDREN

[75] Inventors: Brian D. Kolbus, Minneapolis; Richard H. Jacobs, New Brighton, both of Minn.

[73] Assignee: TRI Industries, Inc., Bloomington, Minn.

[21] Appl. No.: 114,738

[22] Filed: Aug. 30, 1993

[51] Int. Cl.⁶ .................................................. B62B 7/12
[52] U.S. Cl. .................. 280/204; 16/114 R; 280/47.38; 280/62; 280/756
[58] Field of Search .............................. 280/292, 30, 647, 280/648, 650, 652, 47.38, 47.4, 62, 63, 756, 204; D12/129, 133; 16/111 R, 114 R

[56] References Cited

U.S. PATENT DOCUMENTS

| Des. 204,254 | 5/1966 | Cerf . | |
|---|---|---|---|
| Des. 206,116 | 11/1966 | Hughes . | |
| Des. 274,714 | 7/1984 | Cone . | |
| Des. 290,825 | 4/1987 | Mathies et al. . | |
| Des. 297,525 | 9/1988 | Baechler . | |
| Des. 301,850 | 6/1989 | Clement et al. . | |
| Des. 315,885 | 4/1991 | Jacobs . | |
| Des. 341,460 | 11/1993 | Parshall et al. | D12/129 X |
| 699,186 | 5/1902 | Katzke . | |
| 716,972 | 12/1902 | Whitmore . | |
| 2,425,688 | 8/1947 | Schulte . | |
| 2,455,119 | 11/1948 | Hall . | |
| 2,781,225 | 2/1957 | Heideman . | |
| 2,921,799 | 1/1960 | Hatten | 280/756 |
| 3,052,480 | 9/1962 | Sanstrom . | |
| 3,110,504 | 12/1963 | Myers . | |
| 3,193,322 | 7/1965 | Hines | D12/129 X |
| 3,305,244 | 2/1967 | Flagg . | |
| 3,403,744 | 10/1968 | Dinkel . | |
| 3,575,461 | 4/1971 | Goldman et al. . | |
| 3,605,929 | 9/1971 | Rolland . | |
| 3,656,777 | 4/1972 | Keiser, Jr. . | |
| 3,698,502 | 10/1972 | Patin . | |
| 3,712,636 | 1/1973 | Gesslein . | |
| 3,722,906 | 3/1973 | Pierson, Jr. et al. | 280/47.4 |
| 3,781,931 | 12/1973 | Patin . | |

(List continued on next page.)

FOREIGN PATENT DOCUMENTS

| 2579544 | 10/1986 | France . |
|---|---|---|
| 213538 | 9/1909 | Germany . |
| 2348716 | 7/1974 | Germany . |
| 2741543 | 6/1978 | Germany . |
| 851163 | 10/1960 | United Kingdom . |
| 2099765 | 12/1982 | United Kingdom . |
| 2204282 | 11/1988 | United Kingdom . |

OTHER PUBLICATIONS

Cannondale Bicycle Trailer seat Oct. 10, 1990.
American Bicyclist & Motorcyclist, Jun. 1990.
Runabout, 1991.

Primary Examiner—Brian L. Johnson
Assistant Examiner—Michael Mar
Attorney, Agent, or Firm—Palmatier, Sjoquist, Helget & Voigt, P.A.

[57] ABSTRACT

A convertible bicycle trailer and jogging stroller for two children comprises a frame with a rear axle end for supporting two large diameter wheels and a front fork end removably supporting alternatively a front wheel for use in the stroller mode and a trailer cycle hitch assembly attachable to the frame portion of a cycle for use in the trailer mode. The frame has a rigid plastic molded shell which is conformed into a side-by-side two child holder seat portion with side, rear and front portions for substantially enclosing two children and being fastened to the frame. The side portions are configured as side fenders for covering upper portion of the two large wheels. A removable handle is attachable to the rear portion of the sise fenders for use in the stroller mode. The trailer and stroller combination further includes a roll bar and a protective canopy to add further protection of the children. The roll bar has downwardly extending legs with rearwardly extending portions which are secured within the side fenders. The handle has forward end portions which are adapted to be telescopically received within the rearwardly extending portions of the roll bar.

4 Claims, 10 Drawing Sheets

U.S. PATENT DOCUMENTS

| | | |
|---|---|---|
| 3,848,890 | 11/1974 | MacAlpine . |
| 3,873,116 | 3/1975 | Perego . |
| 3,877,723 | 4/1975 | Fahey et al. . |
| 3,909,043 | 9/1975 | Black . |
| 4,029,329 | 6/1977 | Chambers . |
| 4,064,957 | 12/1977 | Parham . |
| 4,072,318 | 2/1978 | Laune . |
| 4,166,630 | 9/1979 | Sullivan et al. . |
| 4,181,317 | 1/1980 | Toda . |
| 4,325,449 | 4/1982 | D-Addio et al. . |
| 4,335,900 | 6/1982 | Fleischer . |
| 4,346,912 | 8/1982 | Habib . |
| 4,353,567 | 10/1982 | Weldy . |
| 4,361,338 | 11/1982 | Kuchenbecker et al. . |
| 4,369,987 | 1/1983 | Witherell . |
| 4,373,740 | 2/1983 | Hendrix . |
| 4,403,673 | 9/1983 | Ball . |
| 4,408,776 | 10/1983 | Randolph et al. . |
| 4,422,663 | 12/1983 | Hon . |
| 4,526,390 | 7/1985 | Slolnik . |
| 4,542,915 | 9/1985 | Wheeler, III et al. . |
| 4,548,423 | 10/1985 | Craven ............... 280/292 X |
| 4,586,721 | 5/1986 | Harada et al. . |
| 4,618,184 | 10/1986 | Harvey . |
| 4,632,420 | 12/1986 | Miyagi . |
| 4,756,541 | 7/1988 | Albitre . |
| 4,902,027 | 2/1990 | Skelly . |
| 4,928,985 | 5/1990 | Nowlin ............... 280/292 X |
| 4,934,728 | 6/1990 | Chen . |
| 4,953,880 | 9/1990 | Sudakoff et al. . |
| 4,973,082 | 11/1990 | Kincheloe ............... 280/756 |
| 5,022,669 | 6/1991 | Johnson ............... 280/47.4 X |
| 5,029,891 | 7/1991 | Jacobs . |
| 5,039,120 | 8/1991 | Stowe . |
| 5,076,599 | 12/1991 | Lockett et al. . |
| 5,123,670 | 6/1992 | Chen . |
| 5,174,622 | 12/1992 | Gutta ............... 280/756 X |
| 5,176,395 | 1/1993 | Garforth-Bles ............... 280/62 X |
| 5,224,720 | 7/1993 | Chaw et al. ............... 280/62 |
| 5,259,634 | 11/1993 | Berner et al. ............... 280/204 |
| 5,265,891 | 11/1993 | Diehl ............... 280/204 X |
| 5,269,548 | 12/1993 | Milligan ............... 280/292 X |
| 5,301,963 | 4/1994 | Chen ............... 280/204 X |
| 5,308,096 | 5/1994 | Smith ............... 280/204 |
| 5,344,171 | 9/1994 | Garforth-Bles ............... 280/62 X |
| 5,398,951 | 3/1995 | Ryu ............... 280/30 |
| 5,460,395 | 10/1995 | Chen ............... 280/204 |

CONVERTIBLE TRAILER AND JOGGING STROLLER FOR TWO CHILDREN

BACKGROUND OF THE INVENTION

This invention relates generally to wheeled infant carriers, and more particularly to a conveniently transportable infant stroller for safely and smoothly carrying two infants or children which is also uniquely convertible to an infant or child trailer for safely and smoothly carrying two children pulled behind a cycle, such as a bicycle.

With the resurgence of physical fitness, persons of all ages, including the parents of infants and young children, have developed great interest in all forms of physical exercise, particularly in jogging and walking at relatively high speeds and the riding of bicycles. Infant jogging strollers are generally shown in U.S. Pat. No. Design 297,525; U.S. Pat. No. 4,934,728; U.S. Pat. No. 4,953,880; U.S. Pat. No. Design 315,885; and U.S. Pat. No. 5,029,891.

Collapsible or foldable baby carriages for walking have long been known and are generally described in U.S. Pat. Nos. 2,781,225; 3,873,116; and 4,072,318. These early carriages have evolved from more cumbersome rigid carriages, as many carriages are now collapsible or foldable as to make them conveniently transported or stored. These carriages are generally prescribed for one child or infant.

Infant trailers for pulling behind a cycle have recently been developed. These trailers are cumbersome, suitable for trailer purposes only and generally permit the carrying of only a single infant or child. Furthermore, many of these trailers pull an infant facing rearwardly, which can be quite scary to the infant or child as he or she does not know where they are going but only where they have been. Furthermore, these carriages in the form of cycle trailers are generally not safe as they may easily be flipped over or become disconnected without the knowledge of the bicycle operator who is facing forward until the problem has occurred.

There is a need for an infant or child convertible bicycle trailer and jogging stroller for two children which includes all the past known refinements of strollers and trailers, but further includes the ability to carry two infants or children facing forwardly in a completely safe environment in a smooth-fashion at relatively higher speeds than simple jogging or walking.

SUMMARY OF THE INVENTION

A convertible bicycle trailer and jogging stroller for two children comprises a frame with a rear axle end for supporting two large diameter wheels and a front fork end removably supporting alternatively a front wheel for use in the stroller mode and a trailer cycle hitch assembly attachable to the frame portion of a cycle for use in the trailer mode. The frame has a rigid plastic molded shell is conformed into a side-by-side two child holder seat portion with side, rear and front portions for substantially enclosing two children and being fastened to the frame. A removable handle is attachable to the rear portion of the shell for use in the stroller mode. The trailer and stroller combination further includes a roll bar and a protective canopy to add further protection of the children.

A principle object and advantage of the present invention is that the convertible bicycle trailer and jogging stroller provides a smooth and safe ride for two infants or children carried in either the trailer mode or stroller mode at relatively higher speeds as opposed to walking or jogging at approximately three to four miles per hour.

Another object and advantage of the present invention is that the trailer mode of the convertible bicycle trailer and jogging stroller permits the two children or infants to face forwardly during motion to permit them to see where they are going and to prevent motion sickness and fear or a feeling of lack of control.

Another object and advantage of the present invention is that the plastic molded shell, which forms the two child holder seat portion, has upwardly extending front, rear and side portions as to completely protect the children carried therein from the hazards of the rotating wheels and possible flying debris kicked up from wheels which may strike the children.

Another object and advantage of the present invention is that the convertible bicycle trailer and jogging stroller has a roll bar in combination with seatbelts to safely protect the children should an accident occur and the stroller or trailer be flipped over on its top while the children are safely kept secured within the confines of the forward, rear and side portions of the plastic molded shell with the assistance of the seatbelts.

Another object and advantage of the present invention is that the convertible bicycle trailer and jogging stroller quickly and easily converts to and from the trailer mode as well as from and to the stroller mode with a minimum of ease.

Another object and advantage of the present invention is that the convertible bicycle trailer and jogging stroller has a removable trailer hitch assembly which permits pivotal movement of the assembly along three axes to prevent the flipping over of the trailer should the pulling bicycle have an accident, fall over or be laid down, as well as to permit a safe and smooth ride as the bicycle turns left or right and goes over slight curves and the like.

Further objects, features and advantages of the present invention will become understood with reference to the following specification, appended drawings and the claims.

DETAILED SPECIFICATION

The convertible bicycle trailer and jogging stroller 10 for two children or infants may generally be seen in FIGS. 1 through 6 and generally includes a rectangular, planar, tubular frame 36 suitably made of metal. The frame 36 has a rear axle end 38 which supports large diameter rear wheels 42 and a front fork end 48 which supports a front wheel 60 when in the stroller mode. When in the trailer mode, a trailer hitch assembly 120 is utilized. Attached to the frame 36 is suitably a plastic molded shell 70 for supporting two children. A removable handle 94 is utilized when in the jogging stroller mode and removed when used in the trailer mode. A roll bar 90 extends upwardly from the side portions of the shell 70 to protect the children. Referring to FIGS. 7 through 10, the protective canopy 100 may generally be seen.

More specifically referring to FIGS. 1 through 6, the frame 36 is tubular, planar and rectangular in shape. Frame 36 has a rear axle end 38 which supports rearwardly directed tabs, tongues or ears with apertures 40. Tabs 40 support the rear wheels 42 by way of axle, bolt and nut arrangements 44 which suitably may be of the "drop-out" type. Four bolt and nut arrangements 46 are located on the frame for securement of the shell 70 to the frame 36 as will be appreciated. The frame 36 has a front fork end 48 with a reinforced cross member 50 from which forwardly extends a fork 52. Fork 52 also has forwardly directed tongues, tabs or ears 54 with slots 56 therein for supporting a front wheel 60 by way of an axle, bolt and nut arrangement 62 which also suitably may be of the drop-out type.

Figure 1:
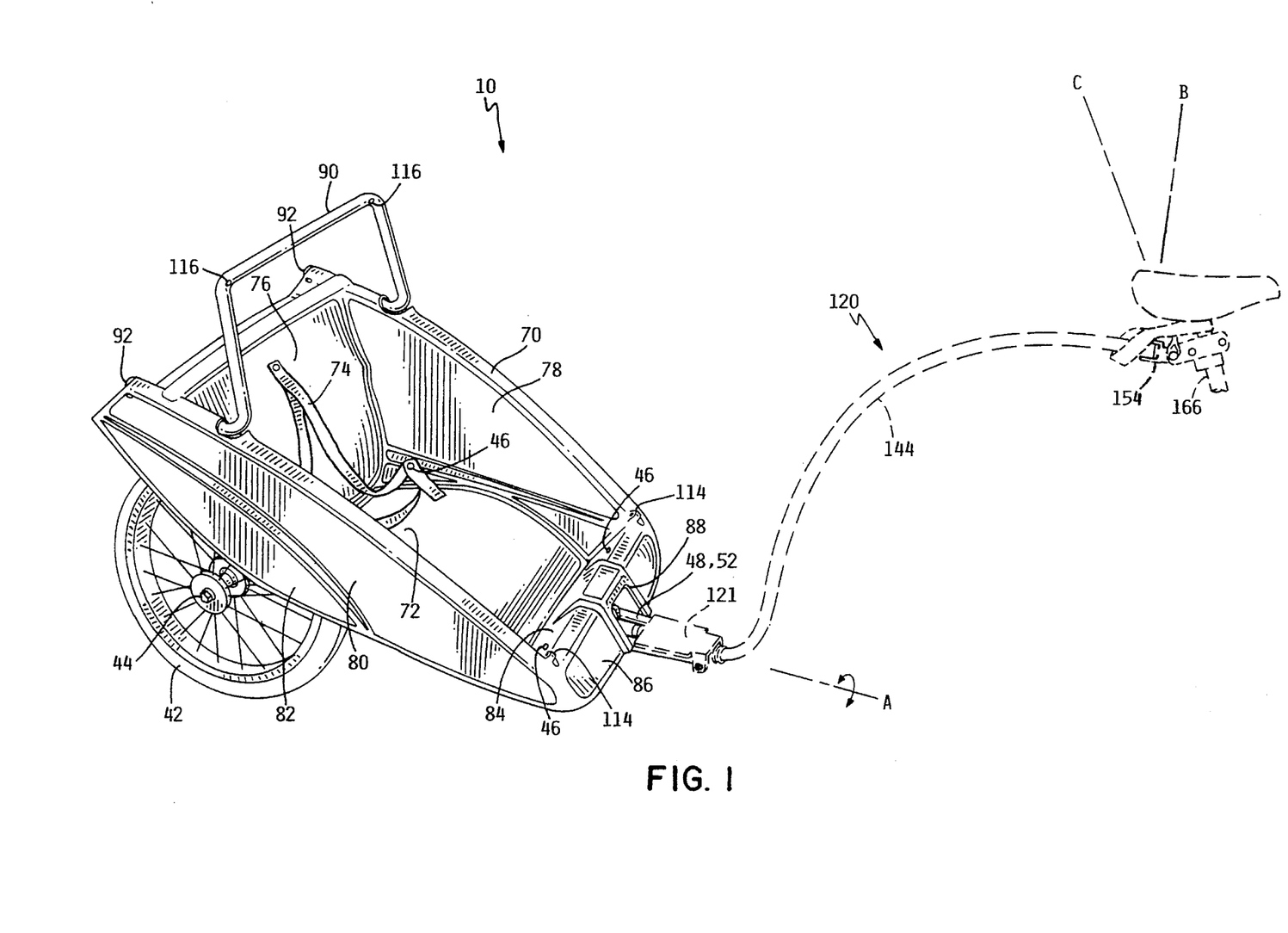
FIG. 1 is a perspective view of the convertible bicycle trailer and jogging stroller of the present invention with its tri-axial trailer hitch assembly with bicycle frame portion partially broken away in phantom outline.
Figure 2:
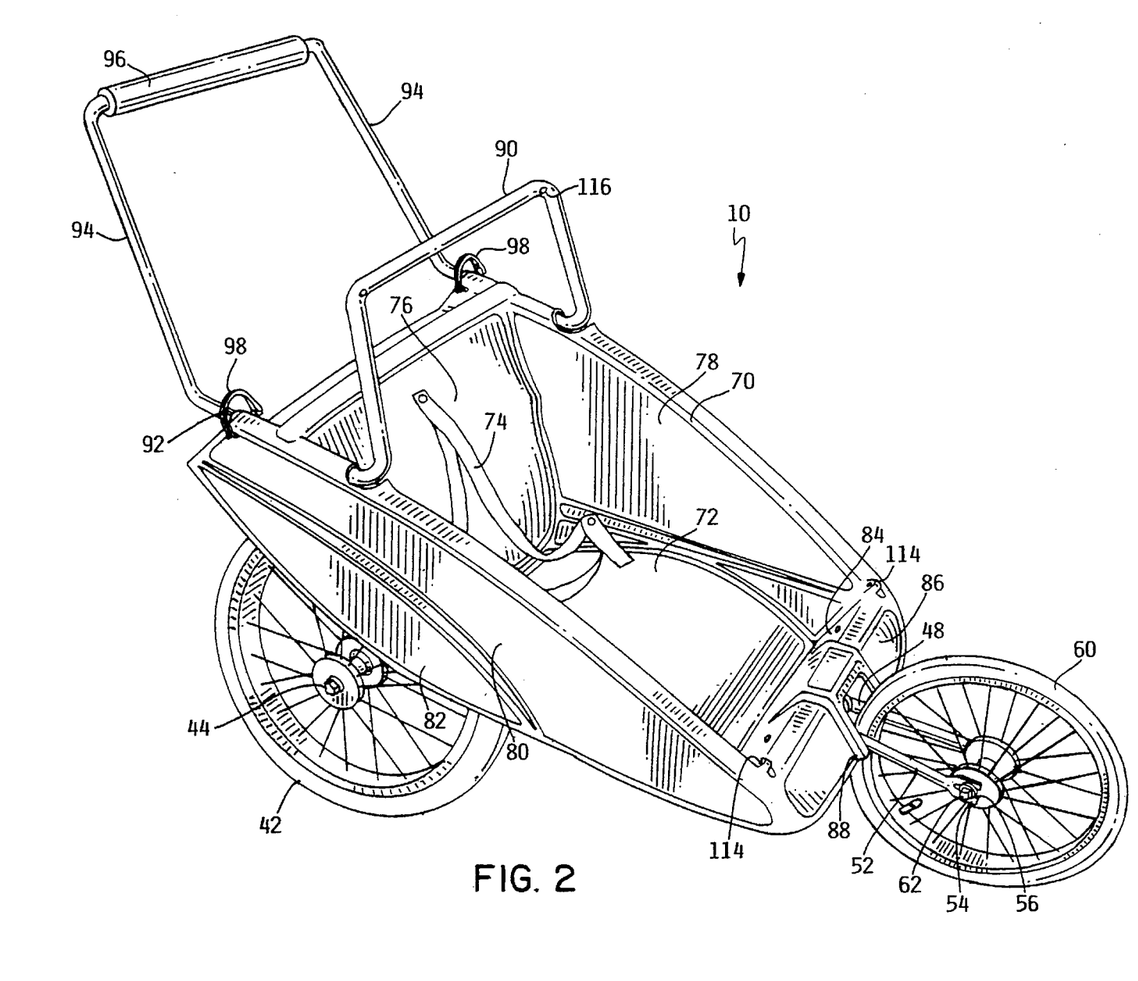
FIG. 2 is a perspective view of the invention in the jogging stroller mode.
Figure 3:
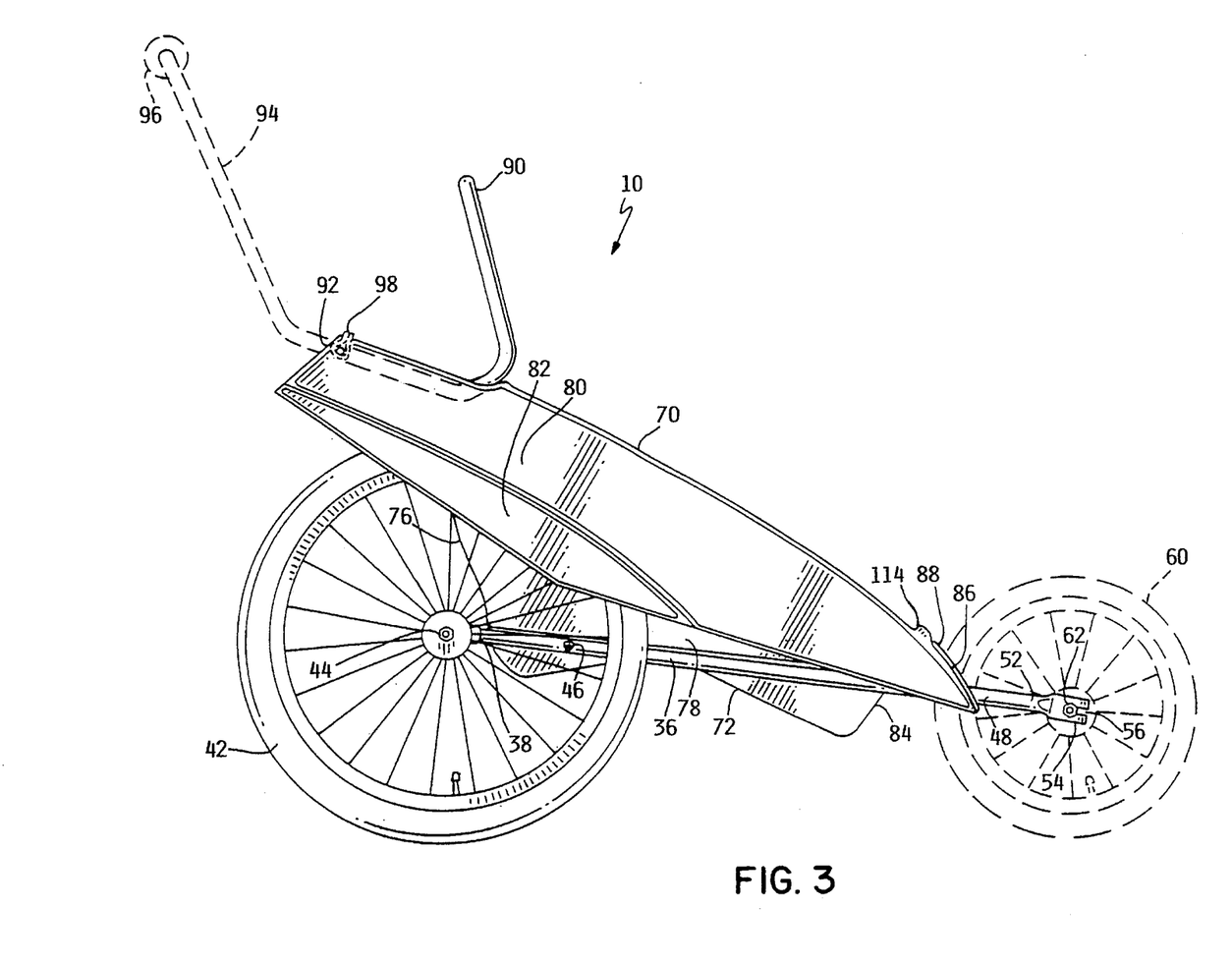
FIG. 3 is a side elevational view of the convertible bicycle trailer and jogging stroller with the front wheel and handle bar in phantom outline.
Figure 4:
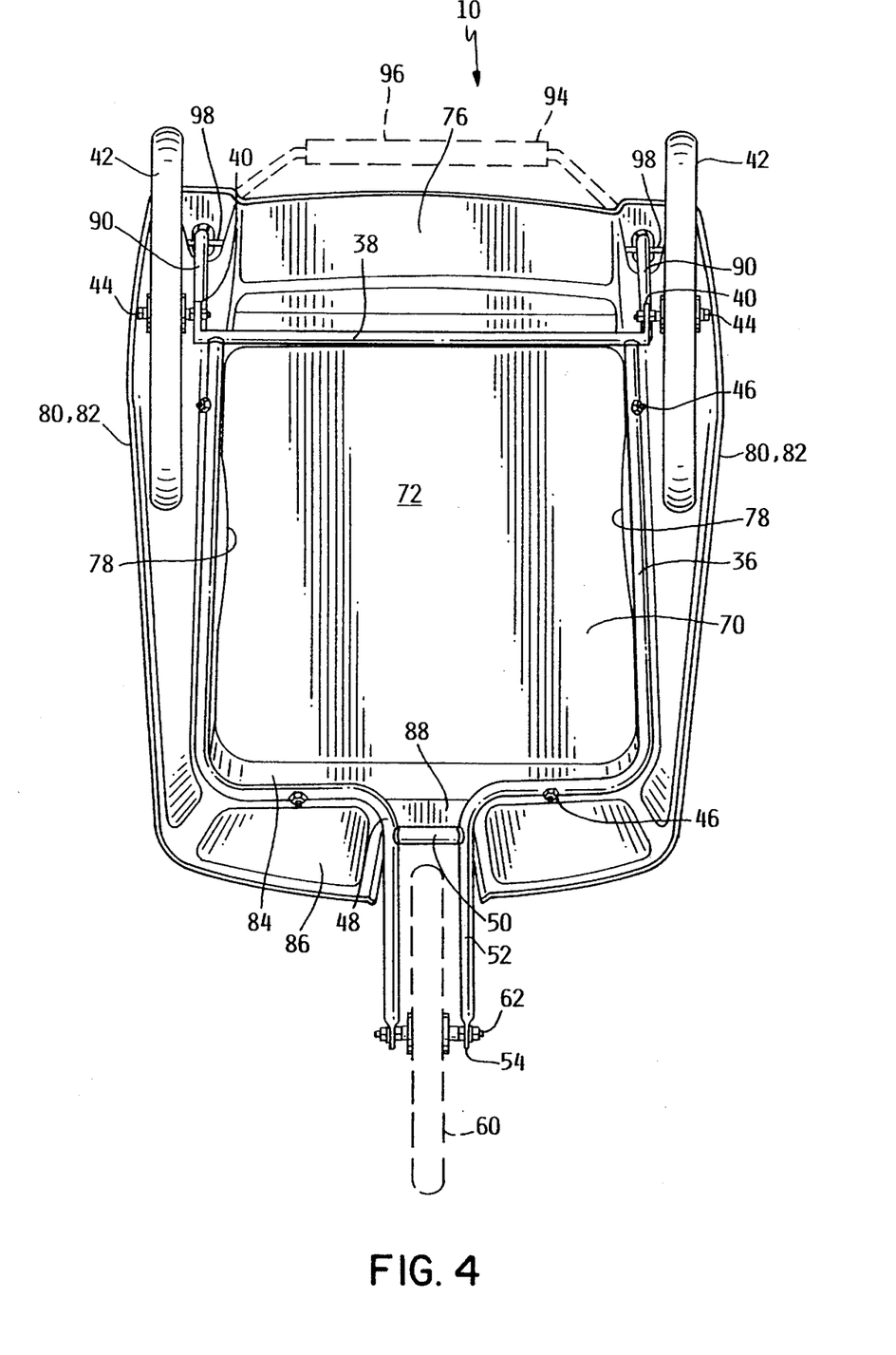
FIG. 4 is a bottom plan view of the convertible bicycle trailer and jogging stroller.
Figure 5:
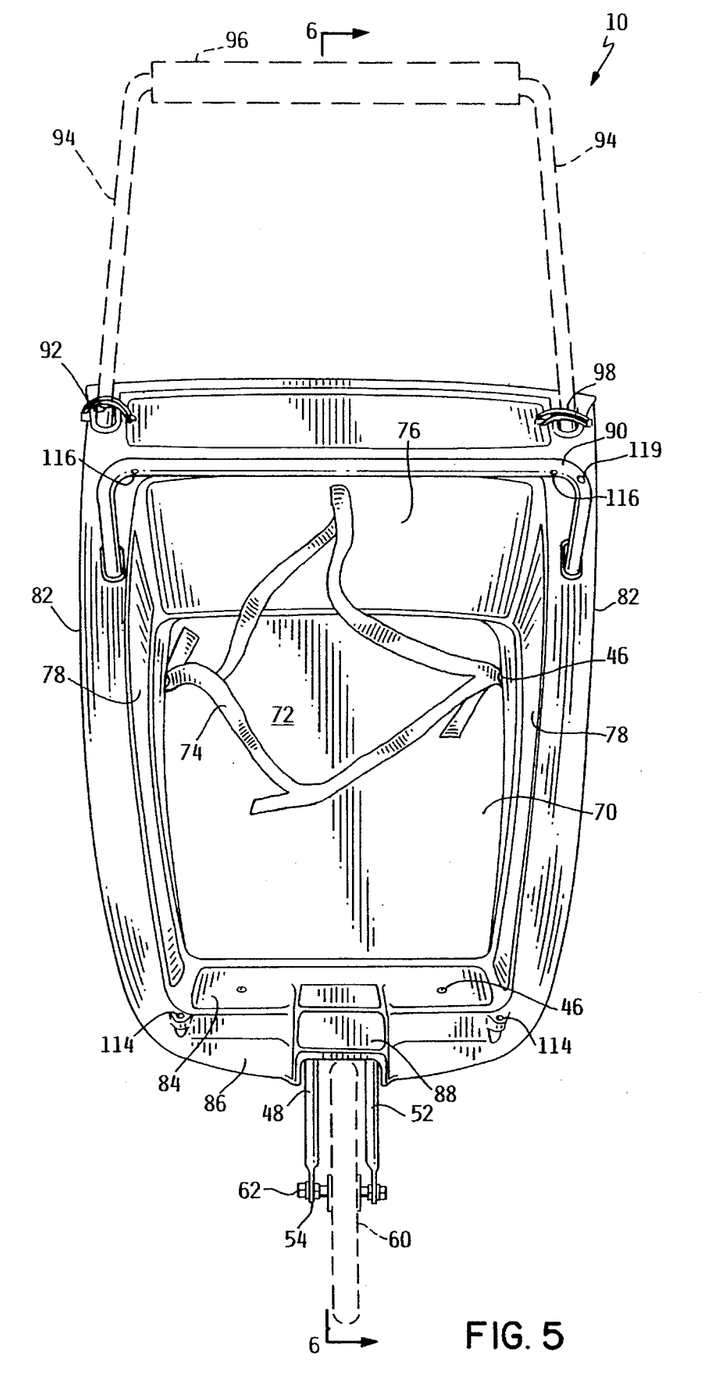
FIG. 5 is a top plan view of the convertible bicycle trailer and jogging stroller wherein the handle and front wheel are in phantom outline.
Figure 6:
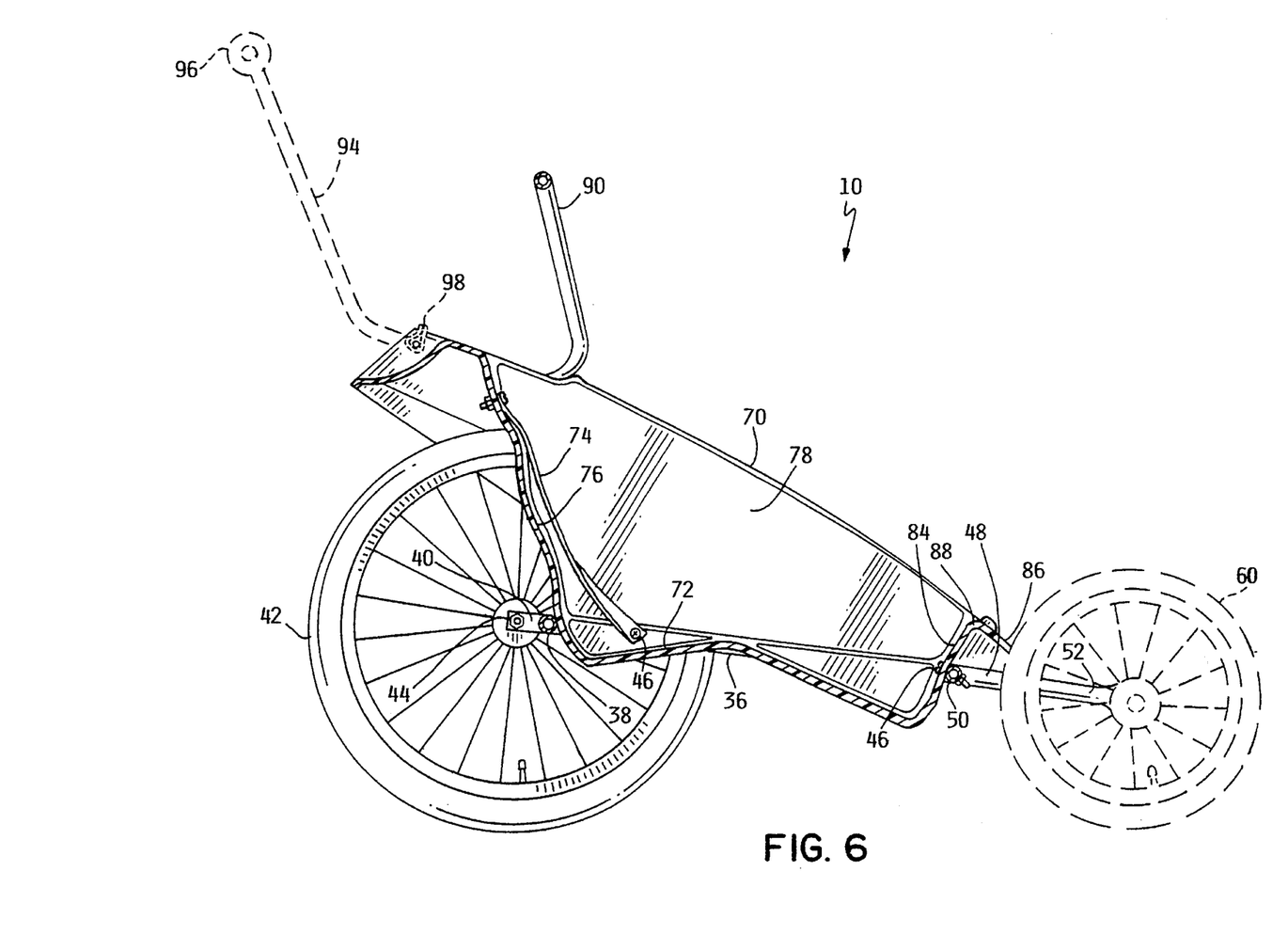
FIG. 6 is a cross-sectional view taken along line 6—6 of FIG. 5.
Figure 7:
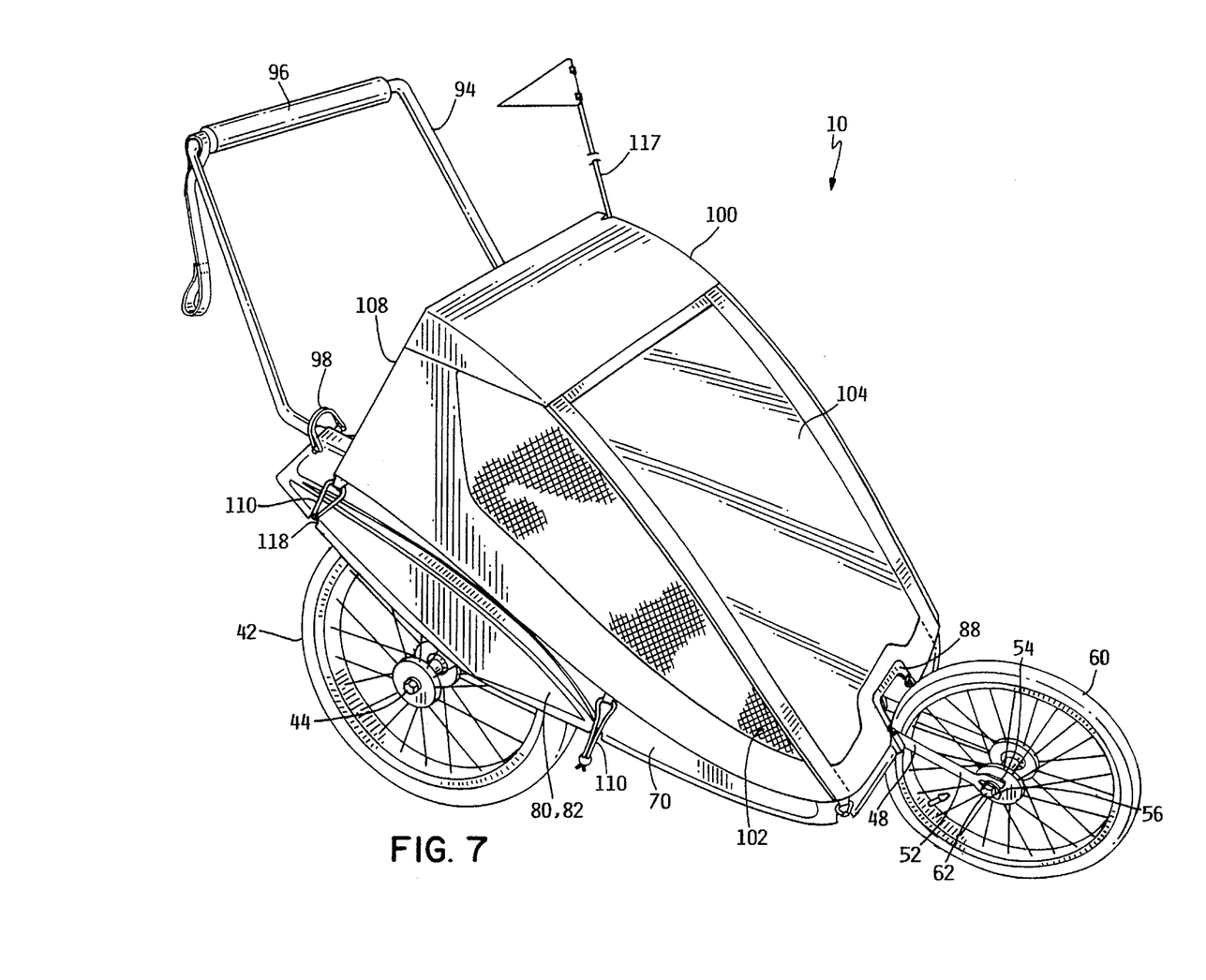
FIG. 7 is a perspective view of the convertible bicycle trailer and jogging stroller of the present invention displaying its protective canopy thereon in the stroller mode.
Figure 8:
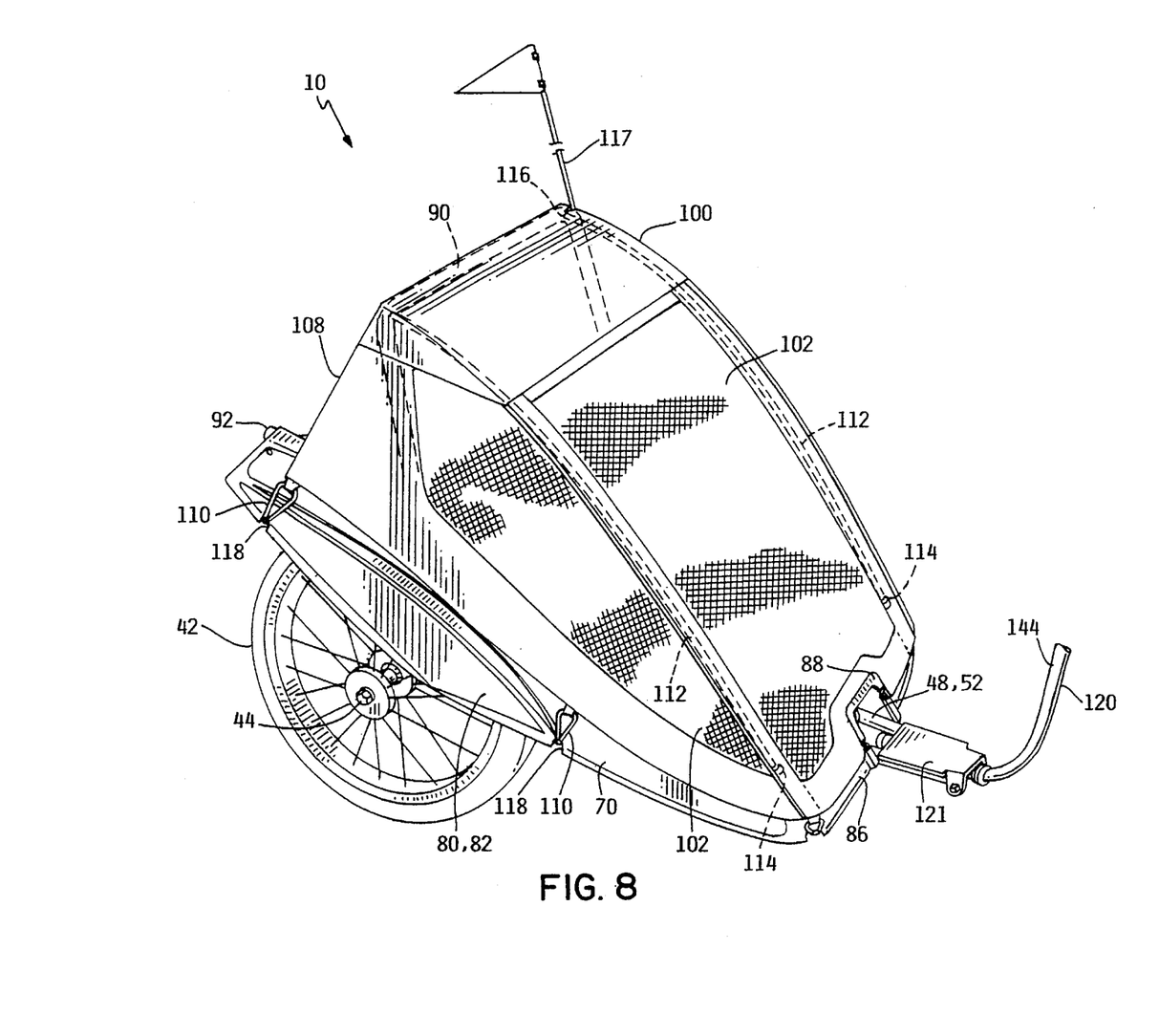
FIG. 8 is a perspective view of the invention in the trailer mode displaying its attached protective canopy with the hitch assembly partially broken away.
Figure 9:
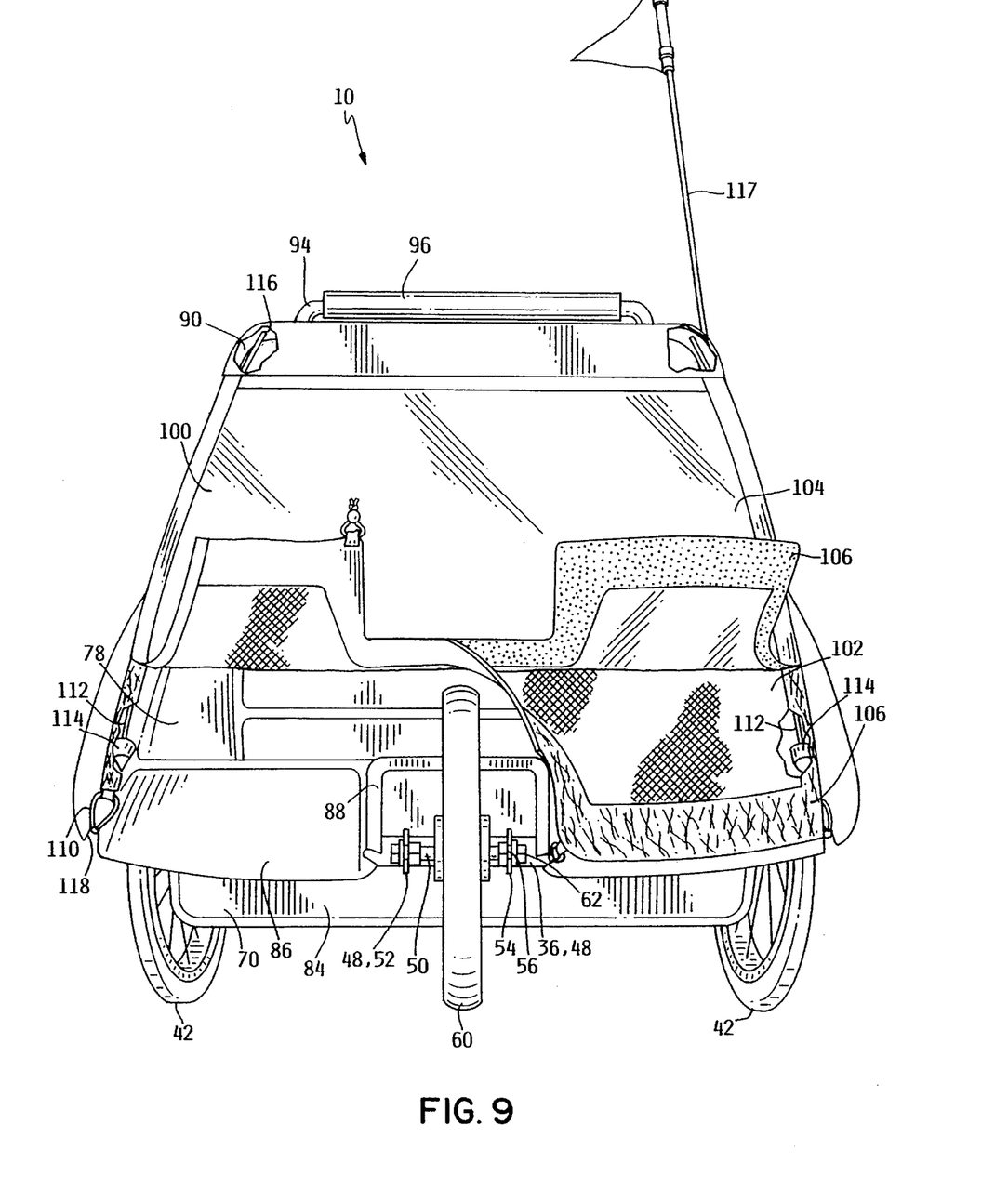
FIG. 9 is a front elevational view of the invention in the jogging stroller mode with its protective canopy shown partially broken away and lifted up to show detail.
Figure 10:
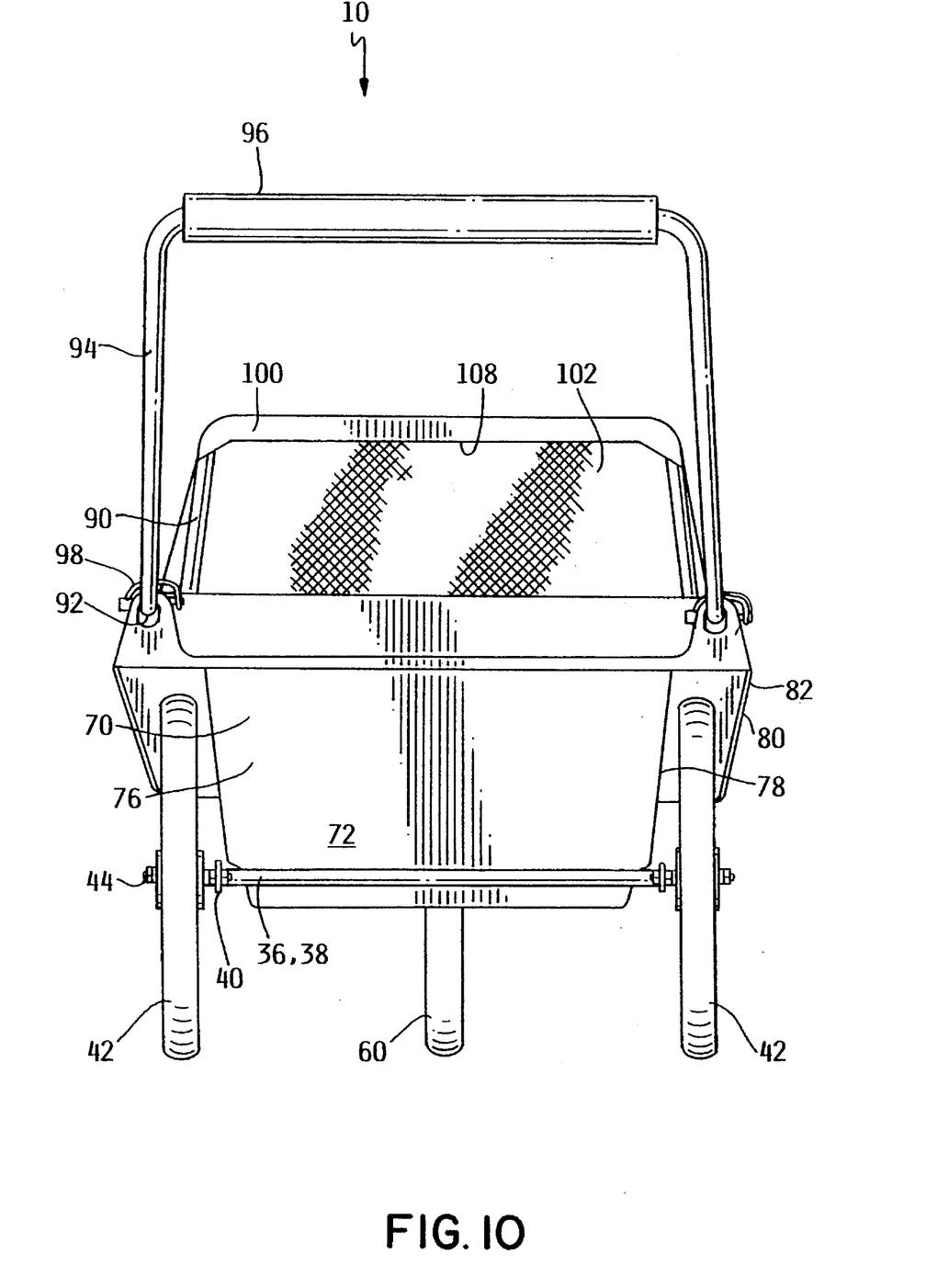
FIG. 10 is a rear elevational view of the invention in the jogging stroller mode.

Specifically shown in FIGS. 1 and 8, the trailer hitch assembly 120 may be appreciated. The hitch assembly 120 is currently the subject of co-owned U.S. patent application Ser. No. 07/992,830, filed on Dec. 18, 1992 and allowed to issue as U.S. Pat. No. 5,259,634 incorporated herein by reference. Hitch assembly 120 includes a removable trailer attachment end 121 wherein the first pivot axis A is located. Extending upwardly from the attachment end 121 is a yoke 144 which terminates in a cycle hitch end 154. The cycle hitch end 154 connects to the bicycle frame 166 shown in phantom outline whereat are second and third pivot axes B and C.

The trailer hitch assembly 120 uniquely permits the assembly to pivot in three axes to assure a smooth and safe ride as the bicycle goes over curves, banks to the left or right, or is laid down on either of its sides—all of which do not turn over the present invention in the trailer mode.

Bolted to the frame 36 by the four bolts and nuts 36 is located the plastic molded shell 70 suitably made of polyethylene. The shell 70 has a contoured side-by-side two child holder seat portion 72 with seatbelts 74 therein. The shell 70 has an upwardly extending rear portion 76 which forms the backrest for the children. The shell also has opposing upwardly extending side portions 76 which curve to downward side portions 80 thereby forming fenders 82 which surround the rear wheels 42 for safety. The shell also has an upwardly extending front portion 84 which then curves to a downward front portion 86 thereby forming a fender 88 to protect the children from the front wheel 60. At the juncture of the upward and downward side portion 78 and 80 is located a roll bar 90 which appropriately may be secured to the shell 70 suitably by bolts. The roll bar 90, as stated, extends upwardly and across the top of the shell 70 to protect the children within the invention should it tip over. The roll bar 90 has rearwardly directed open ends 92 for slidably or telescopically receiving a handle bar 94 which suitably may be padded 96. Handle bar 94 may be secured within the open ends 92 of roll bar 90 by conventionally locking pins 98.

Referring to FIGS. 7 through 10, the protective canopy 100 of the present invention will now be discussed. The canopy 100 suitably may be of a fabric material such as nylon having a flexible screen 102 and a forward flexible plastic 104 which suitably may be secured down by velcro material 106 clearly shown in FIG. 9. The canopy 100 appropriately has an open back 108, which is visible in FIG. 10, to permit the adult to gain access to the children without removal of the canopy 100. The canopy 100 is secured to the shell 70 suitably by stretch cords with balls as will be appreciated. Canopy support rods 112 which suitably may be made of a flexible nylon or plastic. Rods 112 may be bent and the ends of which may be fit into front portion pockets 114 and roll bar pockets 116 thereby forming bows which will support the protective canopy 100 together with the roll bar 90. The shell 70 on its lower periphery of the downward side and front portions 80 and 86 have notches 118 which will receive the stretch cords 110 and will permit securement of the balls of the stretch cords 110 to be held behind the notches 118.

Located on the top side portion of the roll bar 90 is a flag pole hole 119 which will permit the support of flag 117.

Operation of the convertible bicycle trailer and jogging stroller 10 may now be appreciated. In the stroller mode, the front fork end 48 supports the front wheel 60 by the axle arrangement 62. The handle bar 94 is telescopically inserted into the open ends 92 of the roll bar 90 and secured thereat by locking pins 98. The stroller is now in condition for operation. Optionally, the protective canopy 100 may be stretched over the roll bar 70 and the canopy support rods 112 afterwhich the stretch cords with balls 110 are locked in place in the shell notches 118.

Removal of the locking pins 98 permits the removal of the handle bar 94. The axle arrangement 62 may next be released and front wheel 60 removed. Thereafter, the removable trailer attachment end 121 of the trailer hitch assembly 120 may be secured to the tabs 54 of the front fork end 48 or fork 52. Thereafter, the cycle hitch end 154 secured to the bicycle frame 166 and the trailer mode of operation is ready. Similarly, the protective canopy 100 may be utilized.

The present invention may be embodied in other specific forms without departing from the spirit of essential attributes thereof; therefore, the illustrated embodiment should be considered in all respects as illustrative and not restrictive, reference being made to the appended claims rather than to the foregoing description to indicate the scope of the invention.

We claim:

1. A bicycle trailer and jogging stroller for two children convertible between a stroller mode and a trailer mode without removing the rear wheels, comprising:

a) a frame with a fixed rear axle end for fixedly supporting two large diameter rear wheels and a front fork end removably supporting alternatively a front wheel for use in the stroller mode and a trailer cycle hitch assembly attachable to a frame portion of a cycle for use in the trailer mode;

b) a rigid plastic molded shell conformed into a side-by-side two child holder seat portion contoured to the child's body with side, rear and front portions for enclosing two forward facing children, the shell being fastened to the frame wherein the side portions extend upwardly from the child holder seat portion and then downwardly over the rear wheels to form side fenders to protect the children from the rear wheels and the front portion extends upwardly from the child holder seat portion and then downwardly to form a front fender to protect the children from the front wheel, each side fender having a receiving portion formed therein at an upper rearward end thereof, each receiving portion being formed as a linear passageway with forward and rearward openings;

c) a roll bar having a transverse portion extending above the seat portion and two leg portions extending downwardly from opposite ends of the transverse portion, each leg portion being formed with a rearwardly extending portion at a lower end thereof, the rearwardly extending portion extending through the forward opening of the receiving portion of a respective side fender and secured within the receiving portion;

d) a removable handle attachable to the rear portion of the shell for use in the stroller mode, the handle having a pair of leg portions, each leg portion having a forward end portion adapted to be inserted through the rearward opening of a respective receiving portion and tekescopically recieved with in a respective rearwardly extending portion of the rollbar; and e) a removable trailer hitch assembly attachable to the front fork end.

2. The convertible bicycle trailer and jogging stroller of claim 1, further comprising a protective canopy removably attachable and extending upwardly from the front and side portions and over the roll bar to protect the children.

3. The convertible bicycle trailer and jogging stroller of claim 2 further comprising two removable canopy support rods extensible from the front portion to the roll bar.

4. The convertible bicycle trailer and jogger stroller of claim 1, wherein the trailer cycle hitch assembly further comprises a removable trailer attachment end attachable to the front fork end of the frame and being pivotal along a first axis, a yoke portion and a cycle hitch end attachable to a frame portion of the cycle and being pivotal along second and third axes to provide an upright, stable safe ride for the infant in the trailer at relatively higher speeds as the cycle turns left and right, goes over obstacles or is laid down on the ground.

\* \* \* \* \*